(12) United States Patent
Barends

(10) Patent No.: US 7,674,947 B2
(45) Date of Patent: Mar. 9, 2010

(54) RECIRCULATING COMBUSTION SYSTEM

(76) Inventor: James A Barends, 1048 Townsend Cir., Wayne, PA (US) 19087

( * ) Notice: Subject to any disclaimer, the term of this patent is extended or adjusted under 35 U.S.C. 154(b) by 794 days.

(21) Appl. No.: 11/301,525

(22) Filed: Dec. 13, 2005

(65) Prior Publication Data

US 2006/0129020 A1 Jun. 15, 2006

Related U.S. Application Data

(60) Provisional application No. 60/635,700, filed on Dec. 13, 2004.

(51) Int. Cl.
*A62D 3/32* (2007.01)
(52) U.S. Cl. ...................................... 588/314
(58) Field of Classification Search .................. 422/168; 588/314; 110/203, 235, 259
See application file for complete search history.

(56) References Cited

U.S. PATENT DOCUMENTS 5,584,255 A * 12/1996 Bishop et al. ................ 110/235

* cited by examiner

*Primary Examiner*—Tom Duong
(74) *Attorney, Agent, or Firm*—Douglas J. Ryder; Ryder, Lo, Mazzeo & Konieczny, LLC

(57) ABSTRACT

The recirculation combustion system is installed in the exhaust stream of a combustion chamber to increase exhaust cleanliness and thermal efficiency. The system directs hot exhaust gases through a filtering system to remove the larger particulate materials and pollutants, and then return the gas back to the combustion chamber. This system includes a baghouse unit, a molten metal reactor system with automatic feed and waste removal, a separator system, an active exhaust stack and recirculation line control system, and an automatic oxygen and recirculation gas mixing system.

17 Claims, 4 Drawing Sheets

RECIRCULATING COMBUSTION SYSTEM

PRIORITY

This application claims the priority under 35 USC §119 of Provisional Application 60/635,700 entitled "Recirculating Combustion System" filed on Dec. 13, 2004 and having James Barends as the inventor. Application Ser. No. 60/635,700 is herein incorporated by reference in its entirety but is not prior art.

BACKGROUND

Combustion systems in industrial facilities consume huge amounts of energy and in the process create waste byproducts. Industrial combustion systems include boilers, heaters, kilns, furnaces, gas or steam turbines, and reciprocating engines. These systems use thermal energy from burning fuel to transfer heat for materials processing or to produce mechanical energy. Much of the world's convertible energy comes from fossil fuels that are burned to produce heat that is then used as a transfer medium into mechanical energy or other means to generate electricity or accomplish other tasks.

Fossil fuels are any naturally occurring organic fuel, such as petroleum, coal, and natural gas. Fuels used in industrial combustion equipment include natural gas, heavy oil, light oil, fossil fuel by-products, waste fuels and wood waste. Coal is the most abundant fossil fuel in the U.S. Coal found in the eastern U.S. typically has high-sulfur and is found in deep deposits. Conversely, western coal is of low-sulfur content found closer to the surface.

Commercial petroleum fuels are divided into grades which are based on the fuel viscosity. Fuel oil is widely used in power plants. Crude oil can also be used directly, but this is not as desirable. Some of the advantages of oil over coal are that it is cleaner, easier to handle, store and transport, and produces less ash. Also, oil can be atomized and mixed with combustion air to ease burning. One disadvantage of oil is that the ash is very adhesive and difficult to remove. Some oils are high in sulfur which is also difficult to remove. Oil can contain vanadium, which once oxidized, causes corrosion of ferrous materials found in most boilers and furnaces.

Natural gas consists mostly of methane and ethane. Liquefied petroleum gas (LPG) is primarily composed of propane and butane. Natural gas is the easiest of the fossil fuels to burn as it mixes well with air and burns cleanly with little ash. Natural gas has the highest heating value of all fossil fuels, but has the lowest known fuel reserves and requires cryogenic tanks for storage.

Fossil fuels come from the long-term decomposition of plant and animal matter from millions of years ago. Therefore, these fuels are slow to regenerate and are considered a non-renewable resource. Combustion of fossil fuels creates exothermic reactions between carbon, hydrogen and sulfur with oxygen. The byproducts of this combustion process include carbon dioxide (CO2) and sulfurous oxides (SOX). Disassociation reactions with nitrogen (N2), oxygen (O2), and carbon dioxide can occur if the temperature of the process is high enough. These reactions create nitrous oxides (NOX) and carbon monoxide (CO). These resulting gas emissions increase the "greenhouse" effect leading to global warming. These emissions also cause many direct air pollution problems like poor air quality, smog, and, indirectly, acid rain.

Fossil fuels, particularly natural gas, will provide a major portion of world energy requirements over the next several decades. Environmental and cost considerations drive the development of higher efficiency and cleaner burning energy conversion systems. Whereas an internal combustion engine converts about 40% of its fuel into usable power, a typical coal burning power plant extracts only up to 35% of coal's potential energy. More recent development of a hybrid combined cycle plant provides an overall efficiency gain in power generation. Here, the combustion gases from coal or natural gas are first used to drive a gas turbine powering a generator. The exiting gases are then sent to a heat recovery steam unit also generating energy, and lastly to the exhaust stack. The thermal efficiency of this system can reach 60%, but has been limited to intermediate power generation applications.

A combustion system can also be used as an incinerator with the main purpose to dispose or transform the input fuel or added materials. These systems use intense heat to breakdown targeted material for disposal. The input materials are reduced through state changes, oxidation, or other heat induced chemical reactions. The resulting component ingredients are further processed, filtered, and separated into material forms that can be handled for recycling or final disposal. Disposal may include depositing solids into a known waste site such as a land fill or discharging waste water or gases into the environment.

It is clear, industrial combustion systems present some of the most cost-effective opportunities for obtaining significant reductions in contaminant emissions and energy efficiency improvements. Toward this end, some attempts have been made to recycle combustion exhaust gases. In more contained industrial applications, past efforts to recirculate combustion gases have directed only a small percentage of the gas back from the exhaust stream with most of the gas being sent to the exhaust stack. The amount of heat lost can be significant in a large industrial boiler or incinerator because the combustion gases must also be heated to operational temperature in the combustion chamber thereby absorbing heat energy and reducing efficiency. In most cases, the oxygen content of the gas used for combustion is around 20%. Therefore, there is energy lost in heating the remaining 80% even though it does not contribute to the process. In some cases, oxygen enrichment has improved efficiency and pre and post combustion heat exchangers are used to minimize heat loss. However, use of exhaust gas recirculation has been limited because of problems associated with contamination in the exhaust stream with the need to maintain a proper combustion concentration of oxygen. Typically, gas recirculation adds combustion system complexity without significant overall advantage.

SUMMARY

A recirculation combustion system provides a unique means to improve the thermal efficiency of a fossil fuel combustion system typical of an industrial furnace or boiler by recovering the thermal heat currently lost in the combustion exhaust stream. The recirculation combustion system is installed in the exhaust stream of the combustion chamber and directs the hot exhaust gases through a molten metal bath reactor to remove pollutants, and then returns the gas back to the combustion chamber. The returning gas is mixed with pure oxygen to create a direct replacement for combustion air and is fed into the combustion chamber through the standard combustion air inlet ports. The system utilizes equipment and control systems to recirculate approximately 79% of the cleaned and heated exhaust gas to the combustion chamber without any effects to the actual combustion chamber or combustion control process. The system can be installed on existing systems as well as new systems.

The recirculation combustion system is an active control system that regulates flow of recirculated combustion gas to match operating requirements of the combustion chamber where any excess gas above the combustion requirement is directed to an exhaust stack. The recirculation combustion system removes foreign materials and pollutants which would interfere with the clean and efficient operation of the combustion chamber unit. The recirculation system increases the energy efficiency of the combustion process by carrying the exhaust gas heat through the filtration process and back into the input combustion gas. This significantly reduces the heat energy required from the combustion process to heat atmospheric air when used as the combustion oxygen source.

Components included in the recirculation combustion system are also used to eliminate normal industrial pollution. Atmospheric air would be required for initial combustion system startup. The combustion gas can be switched to the recirculated gas once the process is stable. A molten metal reactor is used to chemically breakdown the NOX and SOX gases into components. The molten metal reactor will also chemically break down the sulfuric and organic compounds that will be exhausted from the combustion chamber. Most carbon monoxide, which escapes in the exhaust stream, will react with the molten metal bath and the remainder will be recirculated back to the combustion chamber. Molten metal reactors will also breakdown the fine particulates which are found in almost all fossil fuel combustion that have not been captured in the baghouse. The particles are either broken down chemically or will bond to the bath metals and removed as slag from the reactor. The absorption rate for the fine particulates and gases can be controlled by adjusting particulate and gas bubble surface area introduced into the reactor.

BRIEF DESCRIPTION OF THE DRAWINGS

The features and advantages of the various embodiments will become apparent from the following detailed description in which.

DETAILED DESCRIPTION

Figure 1:
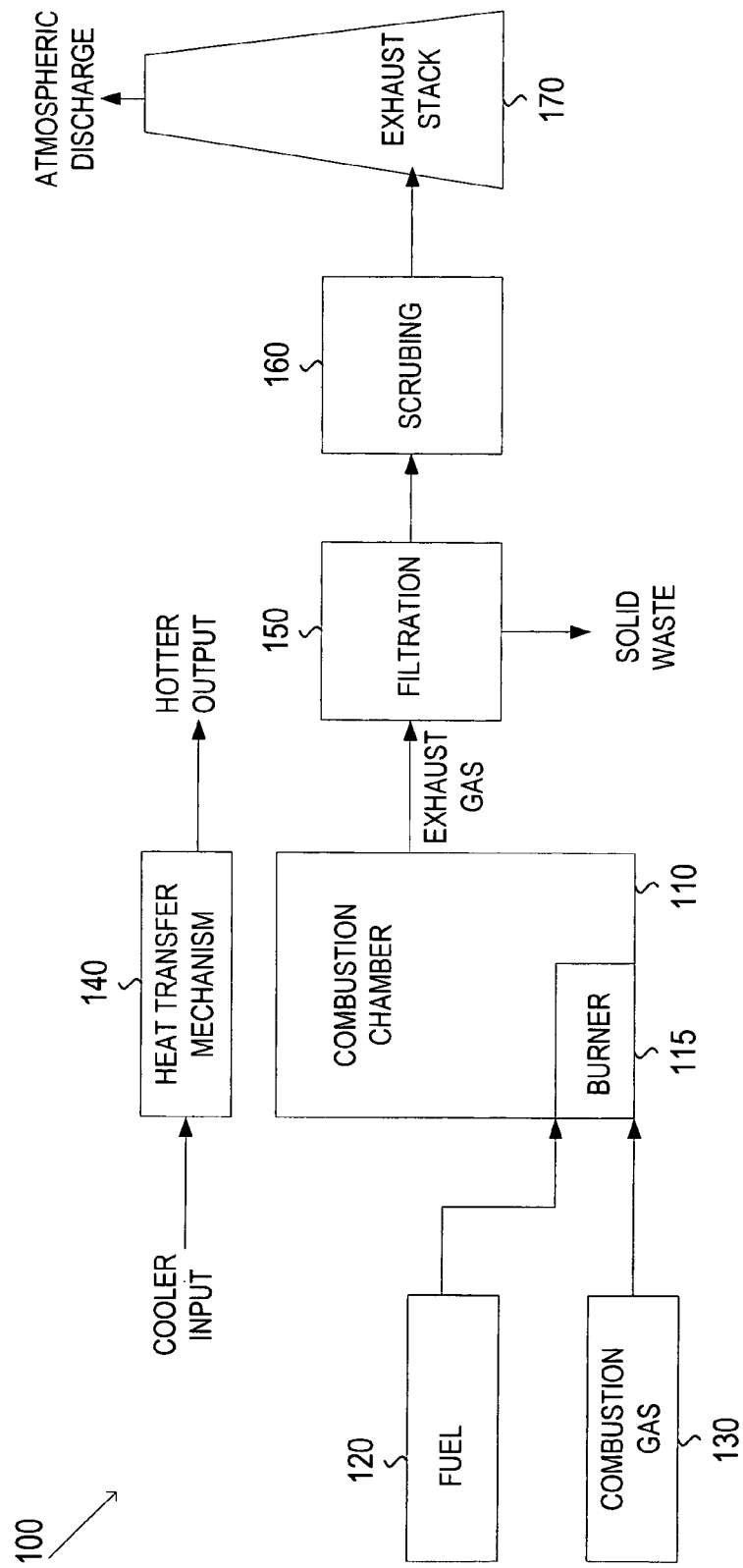
FIG. 1 illustrates an example simplified combustion system, according to one embodiment.

FIG. 1 illustrates an example block diagram of a simplified combustion system 100. The combustion system 100 may include a combustion chamber 110 having a burner 115, a fuel supply 120, a combustion gas (e.g., air) supply 130, a heat transfer mechanism 140, a filtration system 150, a scrubbing system 160 and an exhaust stack 170. In order to sustain combustion, the combustion chamber 110 may receive a mix of fuel from the fuel supply 120 and combustion gas from the combustion gas supply 130 as necessary. The fuel and the combustion gas may be provided from the supplies 120, 130 via complex plumbing systems that may include a series of pumps, valves, blowers, and piping. Solid fuels (e.g., coal) may be transported from the fuel supply 120 via mechanical systems (e.g., conveyor, elevator).

A heat source (not illustrated) may be required to start the combustion process in the chamber 110. Once started, the process may become self sustaining by regulating the fuel-gas mixture. The combustion gas may be any mixture containing an appropriate amount of oxygen (e.g., 21% as is typically in air). The fuel may be liquid or natural gas. The gas fuels (liquid or natural) and the combustion gas may be combined and mixed in the burner 115 prior to being subjected to the chamber heat. Alternately, solid fuels may be used and may be introduced directly into the ongoing combustion process housed in the chamber 110.

The combustion system 100 may be used to generate energy (e.g., turbine propelled generator), dispose of waste (e.g., incinerator), or some combination thereof. The combustion system 100 may transfer heat generated in the chamber 110 to an alternate medium via the heat transfer mechanism 140. The heat transfer mechanism 140 may be a boiler containing water whereby the water absorbs combustion generated heat and changes state to steam. Hot water or steam may be directed to turn a turbine connected to the main shaft of a generator or perform any number of subsequent operations. Alternatively, the combustion system 100 may be used for direct disposal of trash or other waste products.

Combustion gas discharge (exhaust) may be a waste byproduct of the combustion chamber 110. The exhaust may contain water ($H2O$), carbon dioxide ($CO2$), carbon monoxide ($CO$), nitrogen ($N2$), nitrogen oxides (NOX), sulfur oxides (SOX), ash, solids, and other contaminates. The exhaust, or portions thereof, may be detrimental to health. The filtration system 150 may be used to filter out solid waste to minimize environmental impact or meet regulatory guidelines. The exhaust may vary based on varying parameters associated with the combustion chamber 110 including fuel (e.g., coal, gas, oil) and use (e.g., boiler, incinerator). The exhaust may at least in part dictate the type of filtration system 150.

As most combustion chambers 110 are likely to produce ash, the filtration 150 may typically include a post combustion "baghouse" to capture solid waste (ash, solids, and other larger particulates). The baghouse filtration systems reduce the amount of airborne particles and atmospheric emissions. The baghouse filtration systems direct the exhaust through fabric bags that are used to trap the particulate matter. The fabrics may be sewn layers of various materials, such as a course scrim, felt, polyester, and/or membranes. The baghouse does not capture gases and may not capture all of the solid waste.

The filtration system 150 may include other filtration systems, in addition to the baghouse to further remove solids or finer particulates not captured in the baghouse. The other filtration systems may include electrostatic and wet precipitators. The electrostatic precipitators work by ionizing the gas particles to a positive charge and attracting them to a negatively charged collector. The wet precipitators include a scrubber that saturates the gas stream with water to remove the dry fly ash and particulates. The wet ash is separated from the water in settling ponds or through a de-sludging unit. The wet precipitators are normally installed downstream from the baghouse and the electrostatic precipitator.

The use of precipitators increases the system operating cost, and are expensive to install and maintain. The electrostatic filters require electricity to generate ionization. The wet scrubbers use water, land for the holding ponds, and are labor intensive to operate. They also have to contend with freezing in northern climates and equipment corrosion. Additionally, regulatory authorities are moving towards zero water discharge from operating plants.

The filtration system 150 utilized needs to efficiently subtract harmful combustion byproducts and result in regulatory compliant atmospheric gas and water discharge. The make-up of the filtration system 150 depends on the fuels or materials consumed in the combustion chamber 110, the composition of the exhaust generated, cost, and regulatory restrictions on the atmospheric discharge.

The solid wastes captured by the filtration system 150 (e.g., baghouse, electrostatic precipitator, wet precipitator) may be removed for further processing or deposited into a landfill. However, the filtration system 150 may not capture or break down harmful exhaust gas components enough to allow the gases to be discharged through the exhaust stack 170.

The scrubber systems 160 may be used to remove toxic gases to minimize environmental impact or meet regulatory guidelines. The scrubber system 160 may be included within the stack 170. The scrubber systems 160 may include spray and catalyst systems. A spray system may neutralize SOX gases by forcing the SOX gases through a spray of a water based solution containing lime or caustic soda. The SOX and the water based solution react to form a sulfur salt and water. The salt can settle or be filtered from the solution. Similarly, a catalytic system may mix NOX gases with anhydrous ammonia in the presence of a catalyst. The reaction causes the NOX to breakdown and form nitrogen gas and water.

The scrubbing system 160 utilized needs to efficiently subtract harmful gases and result in regulatory compliant atmospheric gas and water discharge. The make-up of the scrubbing system 160 depends on the fuels or materials consumed in the combustion chamber 110, the composition of the exhaust generated, cost, and regulatory restrictions on the atmospheric discharge.

In order to increase the efficiency of the combustion chamber 110, the combustion gases (e.g., air) may be introduced to the combustion chamber 110 at as close to optimum temperature as possible so that minimum energy is expended heating the combustion gases in the combustion chamber 110. The optimum temperature may vary depending on the fuels or materials consumed in the combustion chamber 110 and the operating temperature of the chamber 110. The nominal temperature of the combustion gases is likely well below the optimum temperature.

Accordingly, the combustion gases may need to be heated prior to being provided to the combustion chamber 110. Some type of heating mechanism may be used to increase the temperature of the combustion gases prior to applying the combustion gases to the combustion chamber. The heating mechanism may be a heat exchanger that attempts to utilize heat from the exhaust gases of the combustion chamber 110. For example, combustion gases may pass through piping carrying the exhaust to the stack so that the exhaust heats up the combustion gas. Such heat exchange systems may be expensive and complicated to implement.

Recirculating the exhaust into the combustion chamber 110 would provide gases at a higher temperature and thus increase the efficiency of the combustion chamber 110. However, solid waste and gas waste remaining after the filtration system 150 and the scrubbing system 160 may not be desirable, or possible, to be provided to the combustion chamber 110.

Molten metal reactors can be used to extract contaminants from many materials including gases. The molten metal reactors include a bath of metals in a molten state. Solid materials may be placed into the bath. Gases may be passed through a manifold or lance arrangement into the molten metal. An injection blower may be used to force the gas into the molten metal bath and form bubbles in the molten metal. The materials are dissolved in the molten metal and may break down into constituent parts or bond to alloys in the molten bath to form solid waste that can be removed therefrom.

Exhaust from the combustion chamber 110 may be processed by a molten metal reactor to remove contaminants therefrom. However, the large presence of NOX in the exhaust from the combustion chamber 110 may cause large amounts of metal to be consumed and render the molten metal reactor impractical. Reducing the amount of NOX presented to the molten metal reactor would reduce the amount of metal consumed and enable the molten metal reactor to become practical. One way to reduce the amount of NOX produced is to reduce the amount of nitrogen provided to the combustion chamber 110.

The combustion gas used by the combustion chamber 110 may be air which is approximately 79% nitrogen and 21% oxygen. If the amount of oxygen is maintained within a desirable range (e.g., approximately 20-30%) it is possible that other gases can replace the nitrogen in the air mixture and the combustion chamber will still operate while producing less NOX. The exhaust from the molten metal reactor may have minimum nitrogen as the nitrogen will have been consumed in the molten metal reactor. Accordingly, recirculating the exhaust from the molten metal reactor is one way to reduce nitrogen provided to the combustion chamber and the NOX produced by the combustion chamber.

The molten metal reactor may be used in place of or in conjunction with the filtration and scrubbing systems 150, 160 or portions thereof. The temperature of the combustion chamber exhaust may be sufficient to maintain the metals within the molten metal reactor in molten form so that heating units are not required. The molten metal reactor may be less expensive to operate and more efficient in removing contaminants then many filtration and scrubbing systems 150, 160 (e.g., precipitators). The molten metal reactor does not utilize water to extract contaminants and thus may not have the problems associated therewith (e.g., disposing of liquid waste, freezing, equipment corrosion). The molten metal reactor may remove sufficient contaminants from the exhaust to enable the exhaust to be recirculated back to the combustion chamber 110. The recirculated gases may be able to be used in place of nitrogen that is typically in air.

Figure 2:
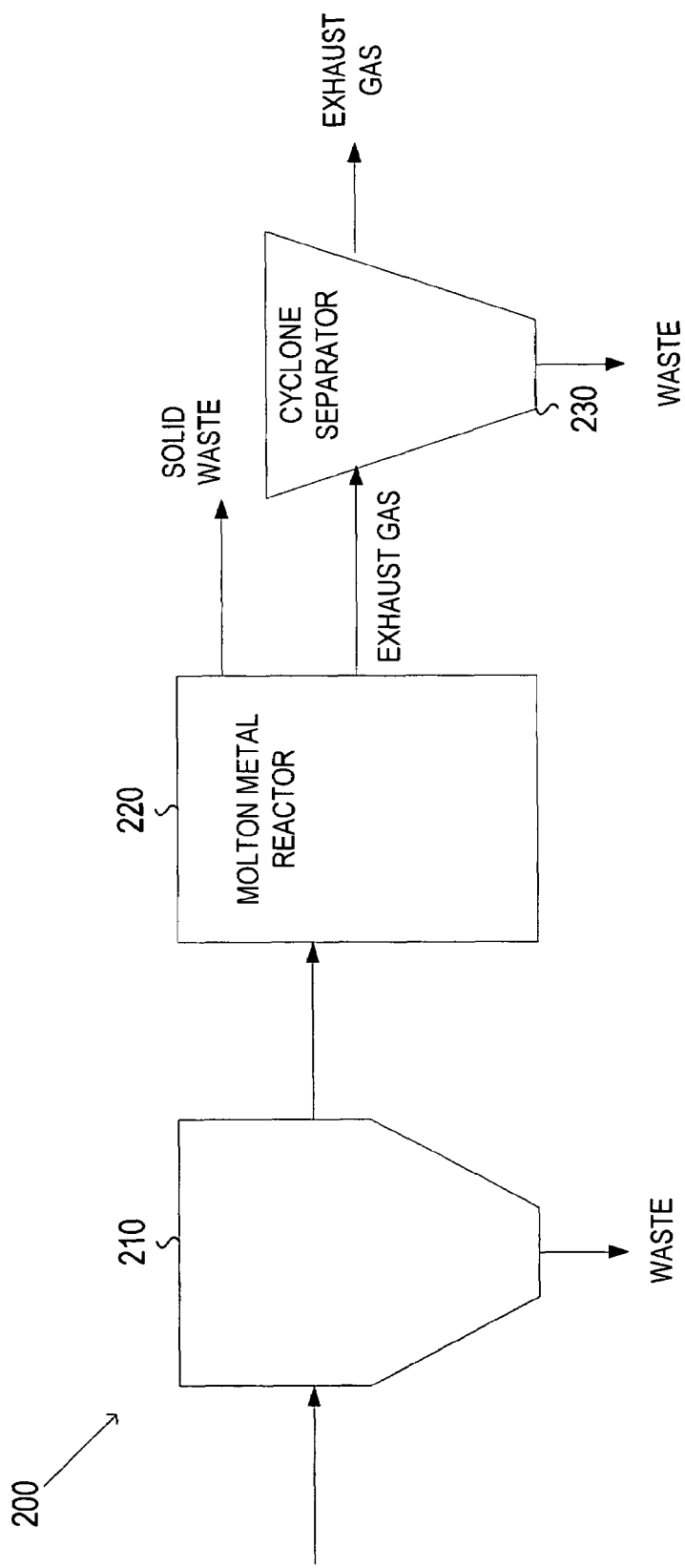
FIG. 2 illustrates an example filtration system for use in a combustion system, according to one embodiment.

FIG. 2 illustrates an example filtration system 200 for use in a combustion system (e.g., 100 of FIG. 1). The filtration system 200 may include a baghouse 210, a molten metal reactor 220 and a cyclone separator 230. The baghouse 210 receives exhaust (e.g., $H_2O$, $CO_2$, CO, $N_2$, NOX, SOX, ash, solids, other contaminates) from the combustion chamber (e.g., 110 of FIG. 1) and captures solid waste (ash, solids, and other larger particulates) by directing the exhaust through filters (e.g., fabric bags) used to trap the solid waste.

The molten metal reactor 220 receives the filtered exhaust gas (e.g., $H_2O$, $CO_2$, CO, $N_2$, NOX, SOX, other particulates) from the baghouse 210. The molten metal reactor 220 may include a molten metal bath that includes metal (e.g., aluminum, steal) and alloys (e.g., magnesium, lithium). The optimum combination of elements in the molten metal bath provide catalytic action to remove undesirable combustion byproducts. As the byproducts produced will vary based on at least in part on the fuel used in the combustion chamber, the elements in the molten metal bath will be based at least in part on the fuel used.

The molten metal bath may have an inert atmosphere at initial startup and may maintain that condition during operation. The atmosphere may compose $N_2$, $CO_2$, argon, or other gases which are non-reactive with the metal alloys. A manifold (injection lance) may provide the gas to the bath. An injection blower may be used to force the exhaust gas into the bath at high pressure, thus causing gas bubbles. The pressure requirements will vary but may range from 200 psi to 600 psi in accordance with design flow rate, the metal bath temperature, depth of the bath, and the bubble pattern design of the injection lance.

The reaction rate of the exhaust gas and the molten metals may be controlled by adjusting the bubble size of the exhaust gas as it is introduced into the molten bath. The bubbles must be broken up into a size to allow the solids to be filtered out and the gases to react. The size requirement may be determined by the combustion fuel and the resulting exhaust composition. According to one embodiment, the temperature and pressure of the filtered combustion chamber exhaust gas is such that it will maintain the reactor metals in a molten state without any additional heat input.

The molten metal reactor 220 may include a single chamber or multiple chambers. The number of chambers may be based on load requirements. If multiple chambers are included they may be configured in series, in parallel, or some combination thereof. Serial chambers may be used to increase system filtration efficiency in cases where the combustion process output is particularly hazardous. Parallel chambers may be used to increase speed of filtration by routing the exhaust stream to multiple chambers (each chamber processes only portion of the exhaust stream). Parallel chambers may also be used to provide redundancy making it possible to shut an active unit down for maintenance, cleaning or repair while leaving the other chambers operational or activating a redundant chamber for operation.

The molten metal reactor 220 may chemically break down the NOX, SOX, and other residual hydrocarbons in the combustion gas. The molten metal reactor 220 may be held at or above 1500° F., which is the temperature at which the molecular bonds of the NOX and SOX gases are broken down into constituents of oxygen, nitrogen, and sulfur. The chemical break down of the NOX and SOX from the exhaust stream may eliminate a major source of smog and pollution. In addition, any unconsumed residual fuel that carries over to the molten metal reactor 220 will also be broken down into constituent components such as carbon and hydrogen.

Alloying elements may be added to the molten metals in the bath to serve as catalysts for this disassociation reaction. The alloys used in the bath will be based at least in part on the combustion fuel utilized and the combustion exhaust generated. Over time, the alloys are consumed by forming salts and solid crystals. The nitrogen, sulfur and oxygen may interact with the alloys and metals to create inert forms of metals (e.g., dross, slag) that can be removed as solid waste. For example, the oxygen may react almost instantly with the molten aluminum and form an aluminum oxide layer (dross) at the top of the bath. The amount of unconsumed oxygen that reaches the molten metal reactor 220 and the amount of oxygen freed by breaking down the NOX and SOX gases will determine the amount of alloy material consumed in the process.

As discussed above, nitrogen consumes large amounts of aluminum from the molten metal bath. Accordingly, combustion chambers that generate large amounts of NOX make us of the molten metal reactor 220 an impractical option. However, recirculating the exhaust gas from the molten metal reactor 220 to the combustion chamber is one way to reduce the nitrogen content of gas provided to the combustion chamber and accordingly the amount of NOX produced. The gases exiting the molten metal reactor 220 may not contain nitrogen or may only contain trace amounts of nitrogen as the molten metal reactor consumes the nitrogen. Utilizing the recirculated gas may result in the combustion chamber producing limited or no NOX. Accordingly, the amount of nitrogen provided from the combustion chamber to the molten metal reactor 220 may be limited to any nitrogen contained in the fuel source. The details of how the exhaust gas from the molten metal reactor is recirculated will be discussed in more detail later.

The carbon may form coke and graphite and may be recovered with the solid waste materials. Carbon components that can be separated may be recirculated to the combustion chamber as fuel. The recirculated gas may consist primarily of carbon dioxide. Utilizing the recirculated carbon dioxide instead of nitrogen as part of the combustion fuel for the combustion chamber may result in a combustion exhaust gas free of, or with limited amounts of, NOX and SOX. The combustion exhaust generated when using recirculated combustion gases made up of primarily of carbon dioxide may consist primarily of carbon dioxide (e.g., approximately 85%). The exhaust may also include water and mercury and possibly trace amounts of nitrogen. An exhaust gas made up of such a large amount of carbon dioxide may allow a major increase in the segregation of carbon from the exhaust exiting combustion equipment and be more easily adapted to meet future regulation of carbon emissions and other green house gases. A typical exhaust gas from a combustion chamber utilizing air made up of a majority of nitrogen (e.g., approximately 79%) may produce a diluted concentration of carbon dioxide (e.g., approximately 16 to 20%). The details of how the exhaust gas from the molten metal reactor is recirculated will be discussed in more detail later.

The molten metal reactor 220 may remove the remaining input exhaust particulates and other wastes from the exhaust. The particulates may form a solid material that will usually sink to the bottom of the molten bath. The solid material will react with some of the alloys and consume some molten material to form a mixture of minerals, salts, and slag. This slag will be removed by an automated scrapper or screw system, cooled, and discarded. The lighter materials that do not sink or are small in size (0.5 micron or less) will rise to the top of the bath and become part of the dross materials that will form on top. All solid materials entrained in the metal reactor are removed as an inert solid waste and can be disposed of in a landfill as non-hazardous material under current regulations.

In-line test instrumentation will monitor the temperature and the chemical composition of the exhaust stream to insure the molten metal baths are operating properly. The monitored gases will include CO2, CO, SOX, NOX and other gases required for compliance with air quality. Periodically, the molten metal bath will be replenished with fresh metal from a separate holding and melting furnace because the process will consume the various alloy elements and base metals in the molten bath. Refreshing is required to maintain a proper alloy ratio and to control the temperature. The alloy mixture and consumption rate will vary with the combustion fuel, combustion byproducts, and material used in the molten bath.

The exhaust stream from the molten metal reactor 220 is provided to the cyclone separator 230 to extract water and mercury from the exhaust stream. The cyclone separator 230 is an efficient and cost-effective means of separating particulates from gases in a pressurized stream. The cyclone separator 230 operates by generating a vortex for a particulate laden gas where centrifugal force pushes particulates and heavy vapors toward the outer cyclone wall where they cool, lose velocity, and spiral downward to discharge. The cyclone separator 230 uses a blower to accelerate the exhaust from the molten metal reactor (e.g., primarily carbon dioxide) into a centrifuge to centrifugally separate water and heavier vapors (e.g., mercury) therefrom. Additional separation may be achieved by utilizing condensers within the cyclone separator 230. The heavier vapors are discharged via a waste line and sent for further treatment or disposal. The total reduction in volume due to separating the water and mercury may be approximately 10% of combustion exhaust. The efficiency of the cyclone separator 230 may depend on the gas composition, flow rates, and the cyclone design.

In some applications, an ultra-fine filtration unit (not illustrated) can be used in place of the molten metal reactor 220 when the combustion chamber is running with cleaner fuels (e.g., natural gas, propane, kerosene, alcohols). The cleaner fuels produce particles as small as 0.25 microns that can be extracted by the ultra-fine filtration unit. The ultra-fine filtration unit may be in parallel to the molten metal reactor so that they can be interchanged depending on the fuel used. The cleaner fuels may be used in place of dirtier fuels (e.g., heavy oil, coal) during initial start-up or when a molten metal reactor needs to be serviced or repaired.

Once the filtration system 200 has processed the exhaust gas, the exhaust gas may be discharged or recirculated back into the combustion cycle.

Figure 3:
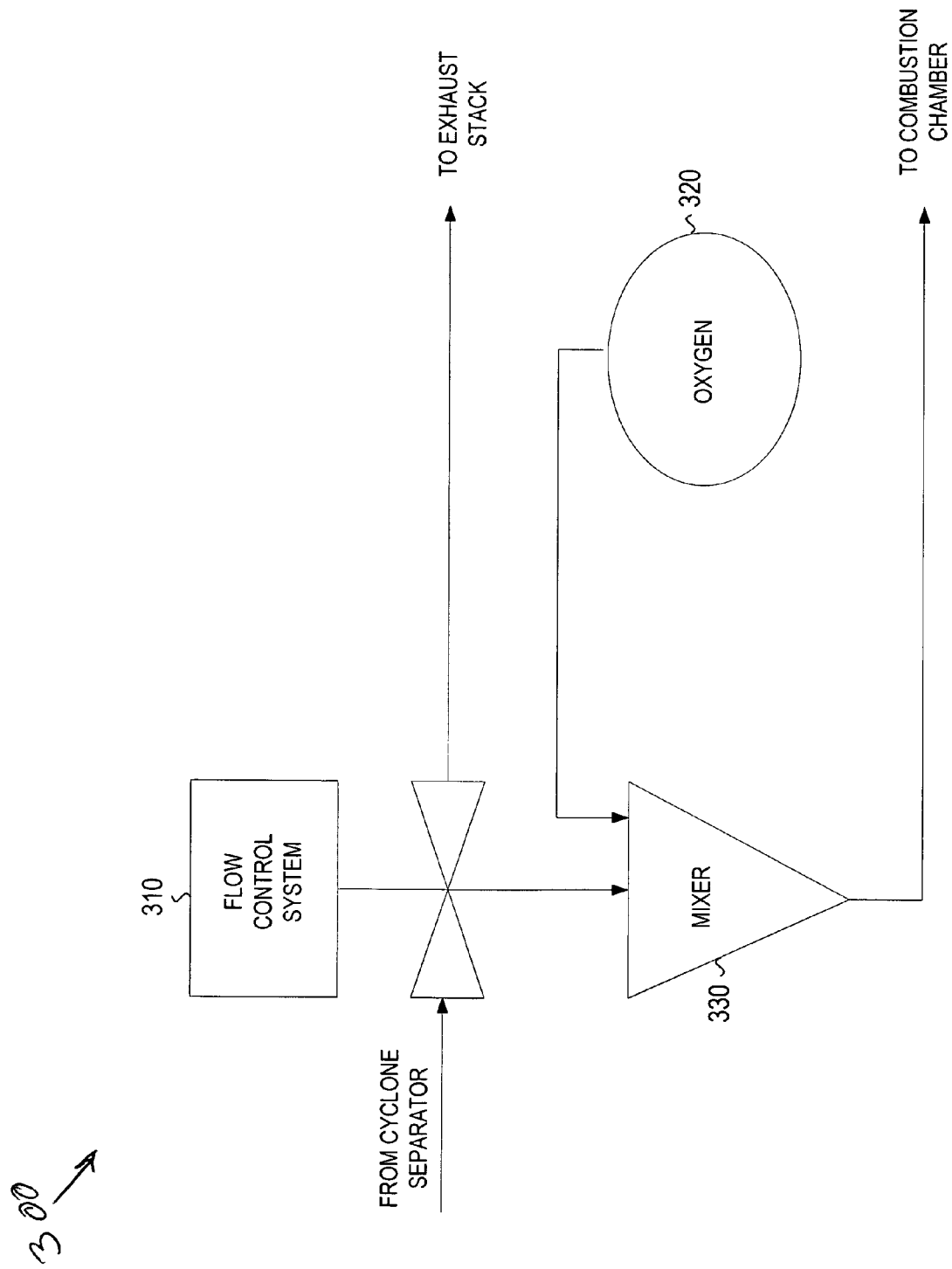
FIG. 3 illustrates an example recirculation system, according to one embodiment.

FIG. 3 illustrates an example recirculation system 300. The recirculation system 300 may be built to withstand the system operating temperatures of 1200° to 1600° F. (nominal temperatures may be around 1400° F.). The recirculation system 300 may include a flow control system 310, an oxygen source 320 and a mixer 330. The filtered exhaust (e.g., from the cyclone separator 230) is received by the flow control system 310. The flow control system 310 may be computer controlled and consist of blowers, dampers, valves, flow rate sensors, and temperature sensors. The flow control system 310 may regulate exhaust gas flow between the exhaust stack (e.g., 170 of FIG. 1) and a recirculating path. During startup, the flow control system 310 may regulate the exhaust gases completely to the exhaust stack. During normal operation of the recirculation system 300, the flow control system 310 may regulate the recirculation stream to match the combustion gas supply requirements. The combustion gas requirements may depend on the firing rate required by the combustion chamber load.

For example under normal conditions the combustion gas supplied to the combustion chamber (e.g., 100 of FIG. 1) may contain approximately 21% oxygen and 79% recirculated stream, so that the flow control system 310 may regulate approximately 79% of the exhaust flow back to the recirculating path. The remaining approximately 21% of the exhaust flow (volume in excess of combustion requirement) may be routed out the exhaust stack. Additional equipment could be installed at the stack to treat the exhaust stream based on additional regulatory requirements for mercury.

The mixer 320 may receive the portion of the recirculated exhaust regulated to the recirculation path and may mix oxygen from the oxygen source 320 into the recirculated exhaust to create a combustible mixture (e.g., 21% oxygen and 79% recirculated exhaust). The combustion mixture is provided to the combustion chamber as the input combustion gas. The mixer 320 may adjust oxygen concentration as needed to control the thermal load conditions in the combustion chamber. For example, oxygen can be added to increase the burnt rate. Oxygen and the amount of coal may be increased to increase the steam output of a coal fired boiler.

The oxygen may be preheated prior to injection in the recirculation loop to increase the efficiency of the combustion chamber (use less energy to heat the oxygen). The oxygen may be heated using preheaters or may be heated using a heat exchanger. The heat exchanger may include using the hot exhaust gas to warm the oxygen within piping used to provide the oxygen to the mixer 330. The heat exchanger may use all the exhaust gas (prior to the flow controller 310), may use the recirculated exhaust gas, or the excess exhaust gas that will be expelled out the exhaust stack to heat the oxygen. Using preheaters or heat exchanges enables liquid oxygen to be stored at very low temperatures in the oxygen storage 320. For example, the oxygen may normally be stored and supplied at about 70° F. The use of the preheaters or heat exchanges may increase the temperature of the oxygen provided to the mixer 330 to about 400° F.

The preheating of the combustion gas is limited to the oxygen stream since the recirculated gases will be at higher temperatures already. The oxygen may be approximately 21% of the recirculated combustion gas. Accordingly, only 21% of the combustion gas (the oxygen) will need to be heated as the other 79% will be recirculated exhaust that need not be preheated. That is, the continuous heating of the non-oxygen content of atmospheric air (e.g., 79%) can be eliminated. The volume reduction requiring preheating is substantial and will lead to direct energy savings in the combustion operation (e.g., increase the overall thermal efficiency of any combustion chamber using any fuel by 10 to 20%).

The recirculation system 300 allows stored oxygen to actively be mixed with the recirculated combustion gas to provide a dependable gas mixture for efficient operation of the combustion unit regardless of the type of fuel. The recirculation stream is monitored for temperature and flow rate before and after oxygen is added to the mixer 330. The recirculation stream after the oxygen is mixed in may consist of carbon dioxide (e.g., approximately 79%), oxygen (e.g., approximately 21%), and water vapor. The recirculation gas temperature may be in excess of 900° F. if 70° F. oxygen is mixed with the recirculation stream, and over 1200° F. if preheated oxygen is mixed with the recirculation stream.

The start-up of such a complex system is performed in stages. Activation of the full recirculating mode is a last stage. The recirculation system 300 may be closed during initial system startup when the combustion system is using normal air for operational startup. The flow control system 310 may release the exhaust flow to the stack during initial start-up for release into the atmosphere. Once the combustion system has achieved stable operation, the exhaust gas may be redirected to the molten metal reactor (e.g., 220 of FIG. 2) and the recirculation control may be opened. The flow control system 310 may release exhaust in excess of the recirculation requirement to the stack for release into the atmosphere. The flow control system 310 maintains the internal system operating pressure and the exhaust gas volume released. The oxygen enrichment stage (e.g., the mixer 330) would normally not be used for system startup due to risks associated with too much oxygen. The recirculated exhaust gas will gradually be added to the combustion air until it is 100% of the input supply. Conversely, during a standard shutdown procedure, the oxygen enrichment stage would be shut off early for safety reasons.

The filtration and recirculation systems 200, 300 are designed to be added to existing installations or new construction. Use of these systems should increase operational flexibility for large operations by allowing operators to switch between a wide range of fuel types without having to alter the emissions systems installations that operate with fossil fuels and utilize atmospheric air for combustion.

Figure 4:
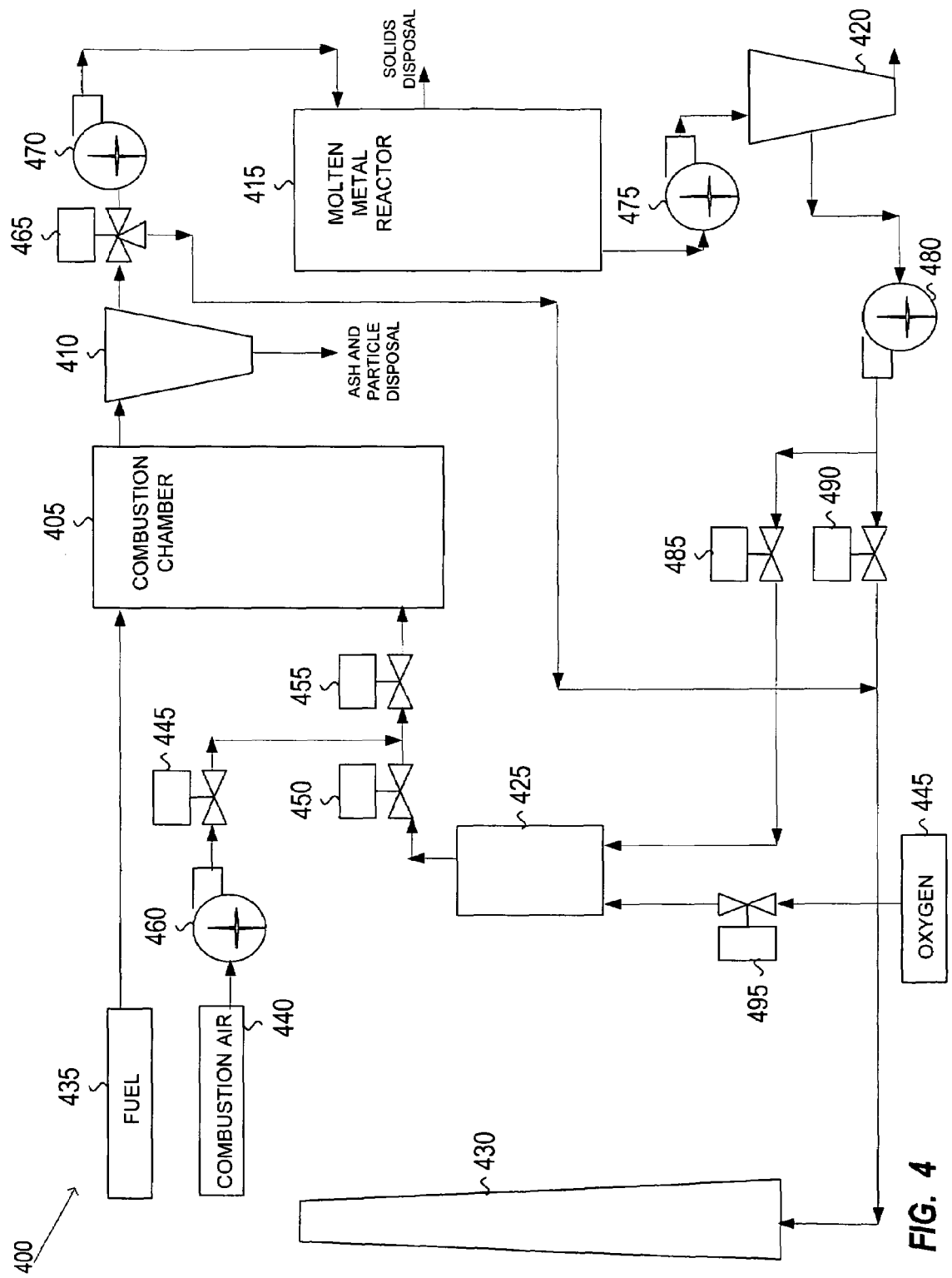
FIG. 4 illustrates an example recirculating combustion system, according to one embodiment.

FIG. 4 illustrates an example recirculating combustion system 400. The system 400 includes a combustion chamber 405, a bag filtration 410, a molten metal reactor 415, a cyclone 420, a mixer 425, an exhaust stack 430, a fuel supply 435, a combustion air supply 440, and an oxygen supply 445. The combustion chamber 405 receives fuel (e.g., fossil fuel) from the fuel supply 435 and combustion gas from the combustion air supply 440 (e.g., during start-up), the mixer 425 (e.g., during operation), or some combination thereof. Valves 445, 450, 455 may control the mix of combustion gas provided to the combustion chamber 405. A blower 460 may be used to provide the combustion gas from the combustion air supply 440.

The combustion chamber 405 produces exhaust that includes gases and solid particles. The large solids are filtered by the bag filtration 410. The filtered gas may either be provided to the exhaust stack 430 (e.g., during start-up), to the molten metal reactor 415 (e.g., during operation), or some combination thereof. A valve 465 controls where the exhaust is provided. A blower 470 may be used to force the exhaust into the molten metal reactor 415 at the appropriate pressure to create appropriate sized gas bubbles. The molten metal reactor 415 breaks down and consumes much of the remaining exhaust. The remaining exhaust is forced into the cyclone 420 using blower 475. The cyclone 420 may extract water and mercury from the exhaust stream. The remaining exhaust stream is forwarded by a blower 480. Valves 485, 490 control what portion of the exhaust is recirculated and what portion exits the stack 430.

The portion of the exhaust that is recirculated is mixed with oxygen from the oxygen supply 445 in the mixer 425. The amount of oxygen supplied may be controlled by valve 495. The oxygen may be approximately 21% of the recirculated gas that is provided to the combustion chamber 405. The oxygen may be heated up by passing it through the exhaust stream (the exhaust stream headed to the stack 430 as illustrated). As previously discussed during initial startup the recirculation system may be shut off. That is, the valve 465 may route the combustion gas to the stack 430. To limit the amount of pollutants emitted during start-up, the combustion chamber 405 may use a cleaner fuel (e.g., natural gas) instead of dirtier fuel (e.g., coal, oil) for that period. After some period of time, the exhaust stream may slowly be diverted to the molten metal reactor 415 using the valve 465. The exhaust from the cyclone 420 may initially be diverted to the stack 430 and then slowly diverted to the mixer 425 until an equilibrium is meet. The combustion air may initially be used in the combustion chamber 405 during start-up but the amount of recirculation air utilized may be slowly increased using the valves 445, 450, 455.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily all referring to the same embodiment. Different implementations may feature different combinations of hardware, firmware, and/or software.

The various embodiments are intended to be protected broadly within the spirit and scope of the appended claims.

What is claimed is:

1. A recirculating system for use with combustion chambers, the system comprising
    a molten metal reactor in communication with a combustion chamber, wherein the molten metal reactor includes a bath of molten metal, an injection lance to direct combustion exhaust gases from the combustion chamber into the bath of molten metal, and an injection blower to force the combustion exhaust gases into the bath of molten metal at high pressure so as to distribute the combustion exhaust gases as bubbles in the bath of molten metal, wherein molten metal within the bath of molten metal acts as a catalyst, reacts with the combustion exhaust gases, and breaks down the combustion exhaust gases into constituent parts, consumes at least a portion of the constituent parts, and expels a reacted exhaust, wherein the reacted exhaust is primarily carbon dioxide;
    a flow controller to receive the reacted exhaust from the molten metal reactor and to regulate flow of the reacted exhaust between an exhaust stack and a recirculating path to the combustion chamber; and
    a flow mixer to receive the reacted exhaust from the recirculating path, mix the reacted exhaust and oxygen, and provide the mix to the combustion chamber.

2. The system of claim 1, wherein the molten metal within the bath of molten metal includes aluminum with alloys.

3. The system of claim 2, wherein the alloys included in the bath of molten metal are based on type of fuel burned in the combustion chamber, the combustion exhaust gas generated by the combustion chamber, and the constituent parts of the combustion exhaust gas to be consumed.

4. The system of claim 1, wherein the injection blower is to adjust the pressure that the combustion exhaust gas is forced into the bath of molten metal through the injection lance to adjust size and flow rate of the bubbles produced, wherein the size of the bubbles is to control reaction rate of the combustion exhaust gas and the molten metal.

5. The system of claim 1, wherein the molten metal reactor chemically breaks down NOX, SOX, and other residual hydrocarbons in the combustion exhaust gas, and wherein the molten metal reactor is maintained at or above 1500° F., which is the temperature at which the molecular bonds of the NOX and SOX gases are broken down into constituents of oxygen, nitrogen, and sulfur.

6. The system of claim 1, wherein temperature of the combustion exhaust gas will maintain metals within the molten metal reactor in a molten state without any additional heat input.

7. The system of claim 1, further comprising a baghouse coupled between the combustion chamber and the molten metal reactor to filter solid waste from the combustion exhaust gas prior to the injection lance directing the combustion exhaust gas to the bath of molten metal.

8. The system of claim 1, further comprising a cyclone separation system coupled between the molten metal reactor and the flow controller to receive the reacted exhaust and remove water and mercury therefrom.

9. The system of claim 1, wherein the flow mixer mixes the reacted exhaust and the oxygen at a controlled ratio to create a gas mixture that is equal to using atmospheric air for combustion.

10. The system of claim 1, wherein the flow mixer provides the mix to the combustion chamber as hot combustion air.

11. The system of claim 1, wherein the oxygen is preheated prior to being mixed with the reactor exhaust.

12. A recirculating combustion system, the system comprising;
    a fossil fuel supply;
    a combustion chamber to burn fossil fuel from the fossil fuel supply, wherein the combustion chamber creates a combustion exhaust gas;
    a molten metal reactor to receive the combustion exhaust gas from the combustion chamber, wherein the molten metal reactor includes a bath of molten metal, an injection lance to direct the combustion exhaust gas into the bath of molten metal, and an injection blower to force the combustion exhaust gas into the bath of molten metal at high pressure as bubbles in the bath of molten metal, wherein molten metal within the bath of molten metal acts as a catalyst, reacts with the combustion exhaust gas, and breaks down the combustion exhaust gas into constituent parts, consumes at least a portion of the constituent parts, and expels a reacted exhaust;

a flow controller to receive the reacted exhaust from the molten metal reactor and to regulate flow of the reacted exhaust between an exhaust stack and a recirculating path to the combustion chamber;

an oxygen supply; and a mixer to receive the reacted exhaust from the recirculating path and oxygen from the oxygen supply, mix the reacted exhaust and oxygen to create a recirculated combustion gas, and provide the recirculated combustion gas to the combustion chamber.

13. The system of claim 12, further comprising a baghouse coupled between the combustion chamber and the molten metal reactor to filter solid waste from the combustion exhaust gas prior to the injection lance directing the combustion exhaust gas into the bath of molten metal.

14. The system of claim 12, further comprising a cyclone separation system coupled between the molten metal reactor and the flow controller to receive the reacted exhaust and remove water and mercury therefrom.

15. The system of claim 12, wherein the mixer is to mix the reacted exhaust and the oxygen so that the recirculated combustion gas has a percentage of oxygen similar to percentage of oxygen in atmospheric air.

16. The system of claim 12, further comprising
a combustion gas supply; and
a valve to control whether combustion gas from the combustion gas supply or the recirculated combustion gas is provided to the combustion chamber.

17. The system of claim 12, further comprising a valve to route the combustion exhaust gas to bypass the molten metal reactor and the recirculating path.

* * * * *